United States Patent
van der Werff

[11] Patent Number: 5,415,266
[45] Date of Patent: May 16, 1995

[54] CONVEYING APPARATUS FOR DISPLACING ARTICLES IN DIFFERENT DIRECTIONS ALONG A TRANSPORT SURFACE

[75] Inventor: Jeichienus A. van der Werff, Montfoort, Netherlands

[73] Assignee: Hadewe B.V., Drachten, Netherlands

[21] Appl. No.: 175,547

[22] Filed: Dec. 30, 1993

[30] Foreign Application Priority Data

Dec. 31, 1992 [NL] Netherlands ............ 9202298

[51] Int. Cl.⁶ ............................................. B65G 37/00
[52] U.S. Cl. ........................... 198/370.09; 193/35 MD
[58] Field of Search ............... 198/598, 361, 365, 372, 198/780, 782, 790; 193/35 MD

[56] References Cited

U.S. PATENT DOCUMENTS

| | | | |
|---|---|---|---|
| 4,180,150 | 12/1979 | Moore | 193/35 MD X |
| 4,264,002 | 4/1981 | Van Der Schie | 198/361 X |
| 4,598,815 | 7/1986 | Adama | 198/598 X |
| 4,746,003 | 5/1988 | Yu et al. | 198/372 X |
| 4,792,034 | 12/1988 | Leemkuil | 198/372 |
| 5,228,585 | 6/1993 | van der Werff | 198/372 |

FOREIGN PATENT DOCUMENTS

| | | |
|---|---|---|
| 0311699 | 4/1989 | European Pat. Off. . |
| 2407150 | 5/1979 | France . |
| 1289778 | 2/1969 | Germany . |

*Primary Examiner*—James R. Bidwell
*Attorney, Agent, or Firm*—Burns, Doane, Swecker & Mathis

[57] ABSTRACT

The apparatus comprises a plurality of driven transport wheels (2) each suspended for rotation about a centerline (3) thereof and for pivotal movement about a steering axis (4) directed perpendicularly to the transport surface (1), and a string (5) passing over a driving and a driven sheave (6 and 2, 7, respectively). The driven sheave (2, 7) is pivotable along with the associated transport wheel (2). According to the invention, the string (5), between the driving and the driven sheaves (6 and 2, 7, respectively), passes closely to the associated steering axis (4) over divert rollers (8).

16 Claims, 3 Drawing Sheets

CONVEYING APPARATUS FOR DISPLACING ARTICLES IN DIFFERENT DIRECTIONS ALONG A TRANSPORT SURFACE

BACKGROUND OF THE INVENTION

This invention relates to a conveying apparatus for displacing articles having at least one substantially flat side along a transport surface in different directions. Such apparatuses typically comprise a plurality of driven transport wheels each suspended for rotation about a centerline thereof and for pivotal movement about an associated steering axis directed perpendicularly to the transport surface.

From French patent application 2 407 150 an apparatus is known which, for driving rotation of the transport wheels about the centerlines thereof is provided with a string passing over a driving sheave, driven sheaves and, between the driving sheave and one of the driven sheaves, at least one divert roller. The driven sheaves and the divert roller are each associated with one of the transport wheels and the driven sheaves are pivotable along with the associated transport wheel about the associated steering axis.

In such a conveying apparatus an article to be displaced along the transport surface is supported by the transport wheels. The article can be displaced by driving the transport wheels, so that they rotate about their centerlines. Changing the direction of transport is possible by pivoting the transport wheels about the associated steering axes directed perpendicularly to the transport surface.

Each of the transport wheels mentioned is drivable by means of the string. The driven string sheave, which, along with an associated transport wheel, is pivotable about the steering axis, can be displaced relative to the driving string sheave, which itself is exclusively rotatable about its centerline. The driving string permits a certain angular displacement of the centerlines of the driving and the driven string sheaves relative to each other, so that the transport wheels can be steered through the same angle.

The endless string extends from the driving sheave over a first one of the divert rollers to a gutter in the transport wheel which forms the driven sheave. From the driven sheave the string passes over another one of the divert rollers and meets the driving sheave in a position opposite the position from where it extended to the first one of the divert rollers. Then the string passes over still another one of the divert rollers to another one of the transport wheels and then via still another one of the divert rollers back to the driving sheave. Thus two axially spaced transport wheels are driven by a single string.

A drawback of this known apparatus is that the length of the string increases considerably according as the angle between the axes of a driving string sheave and an associated driven string sheave increases. In order to permit such elongation, the string should have a considerable elasticity, which, however, is at the expense of the accuracy of the drive of the transport wheel and of the forces to be transmitted.

A further drawback of this known apparatus is that the string, when the centerlines of the driving and the driven string sheaves have been displaced relative to each other, shifts in axial direction over the driving string sheave as it is rotating. This causes a considerable wear of the string.

SUMMARY OF THE INVENTION

The object of the present invention is to provide a conveying apparatus wherein, upon displacement of the driven string sheave relative to the driving string sheave, the length of the string changes to a lesser extent than in the known apparatus and wherein the string wears to a lesser extent.

This object is realized according to the present invention in that the string passes over the divert roller in an area close to the steering axis of the transport wheel associated with that divert roller.

The divert wheels guide the string between the driving and the driven string sheaves closely along the steering axis. The length of the string portions between the circumference of the driven string sheave and those positions in the area of the steering axis is less dependent on the angle between the centerlines of the driven and driving string sheaves than in the case where the string of the driven string sheave would pass directly to positions spaced from the steering axis. As a result, the variation in the length of the string upon rotation of the driven string sheave about the steering axis is less than in the known apparatus and a string made of relatively low-stretch material can be used. A further advantage of the invention is that the driven string sheaves to be used can be relatively large string sheaves. Thus relatively large couples can be transmitted and high speeds of the string sheaves and small bending radii of the string can be avoided.

A further advantage of the invention is that the distance between the driving and the driven string sheave can be relatively small without this leading to proportionally large changes in the length of the string upon pivotal motion of the driven string sheave about the associated steering axis.

DETAILED DESCRIPTION

Figure 1:
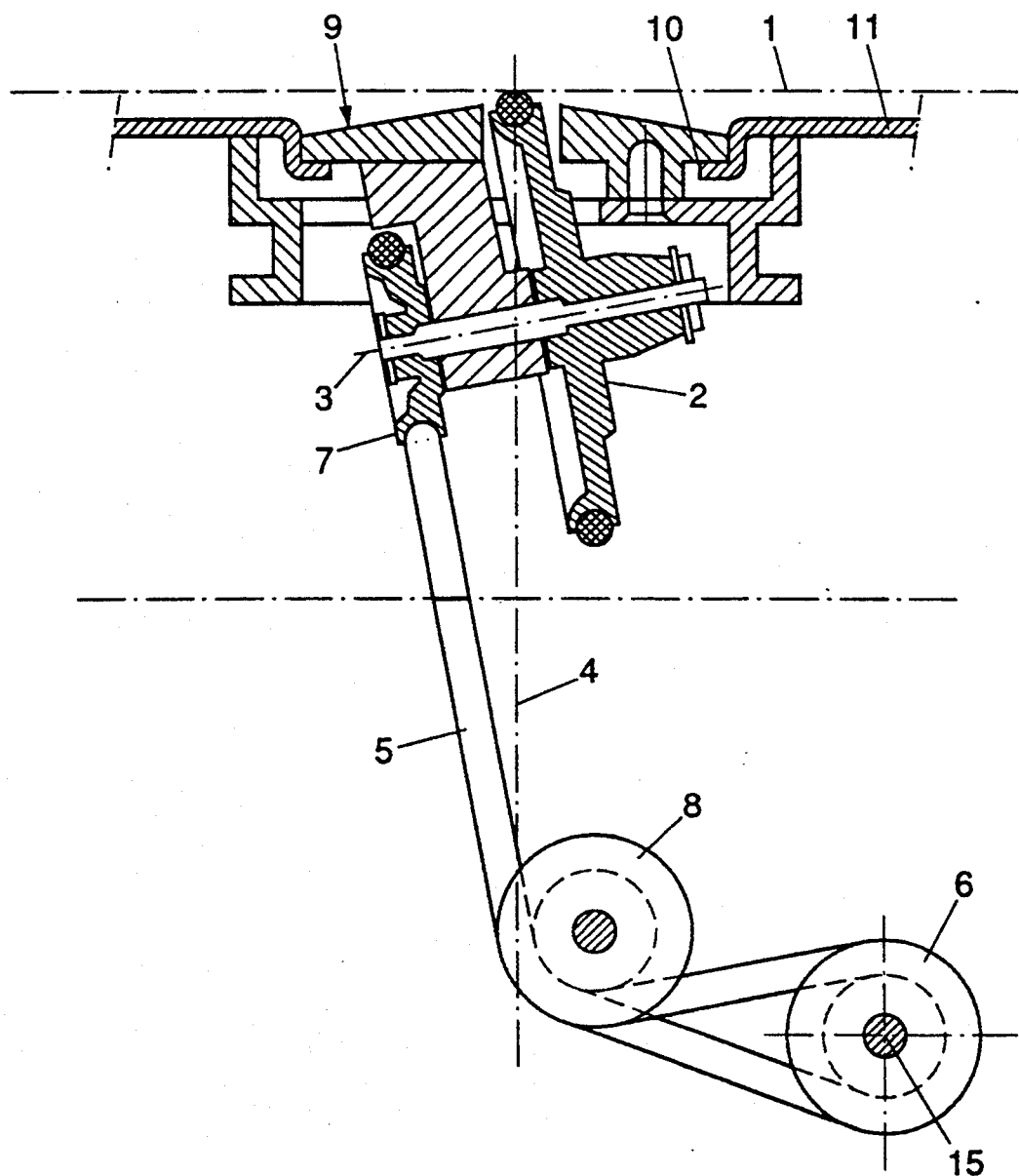
FIG. 1 is a side elevation, partly in section, of a transport wheel with drive means according to a first exemplary embodiment of the invention.

In the drawings, corresponding parts of the different embodiments of the invention are designated by the same reference numerals.

The exemplary embodiments shown each form a part of a conveying apparatus for displacing articles having at least one substantially flat side in different directions along a transport surface. A complete apparatus will comprise a plurality of driven transport wheels, such as is known, for instance, from European patent application 0 311 699. The transport surface is designated in the drawings by a chain-dotted line 1.

Each of the transport wheels 2 shown is suspended for rotation about its centerline 3 and for pivotal motion about a steering axis 4 directed perpendicularly to the transport surface 1. Further, each of the transport wheels 2 is drivable by a string 5, which passes over a driving string sheave 6 and a driven string sheave 7 (FIG. 1) for driving a transport wheel 2. In the exemplary embodiments according to FIGS. 2-5 the transport wheel 2 at the same time forms the driven string sheave. The driven string sheave 2, 7 and the transport wheel 2 are pivotable about the steering axis 4.

Between the driving and the driven string sheave, in the area of the steering axis 4 of a transport wheel 2 driven by the string 5, the string 5 passes over divert rollers 8.

The divert rollers 8 guide the string 5 between the driving and the driven string sheaves 6 and 2,7, respectively, along positions adjacent to or coinciding with the steering axis 4. The length of the string portions between the circumference of the driven string sheave 2, 7 and those positions adjacent to or coinciding with the steering axis 4 varies only very little, if at all, in practice when the angle between the centerlines of the driving and the driven string sheaves 2, 7 and 6, respectively, is varied. As a result, the variation in the length of the string 5 upon rotation of the driven string sheave 2, 7 about the steering axis 4 is correspondingly small and a string 5 of relatively low-stretch material can be used.

The driven and the driving string sheaves 2, 7 and 6, respectively, can have a relatively large diameter without this leading to considerable variations in the length of the string upon displacement of a transport wheel 2 and the associated driven string sheave 2, 7 about the steering axis 4. As a result, relatively large couples can be transmitted and high speeds of the string sheaves 2, 6, 7 as well as small bending radii of the string can be avoided.

Depending on the embodiment, the direction in which the string 5 extends from the driving string sheave 6 is little dependent or not dependent at all on the angle between the driven and driving string sheaves 2, 7 and 6, respectively. When the driving string sheave is suitably oriented, with the string 5 between the string sheave 6 and the divert rollers 8 extending substantially perpendicularly to the centerline of the string sheave 6, the string 5 is prevented from wearing as a result of its axial shift or its rubbing against a flange of the driving string sheave 6.

The distance between the driving and the driven string sheaves 6 and 2, 7, respectively, can be relatively small without this leading to proportionally large changes in the length of the string 5 upon pivotal motion of a transport wheel 2 with the driven string sheave 2, 7 about the associated steering axis 4.

The suspension of the transport wheels can be constructed in different manners, options including different examples known from the prior art.

Figure 4:
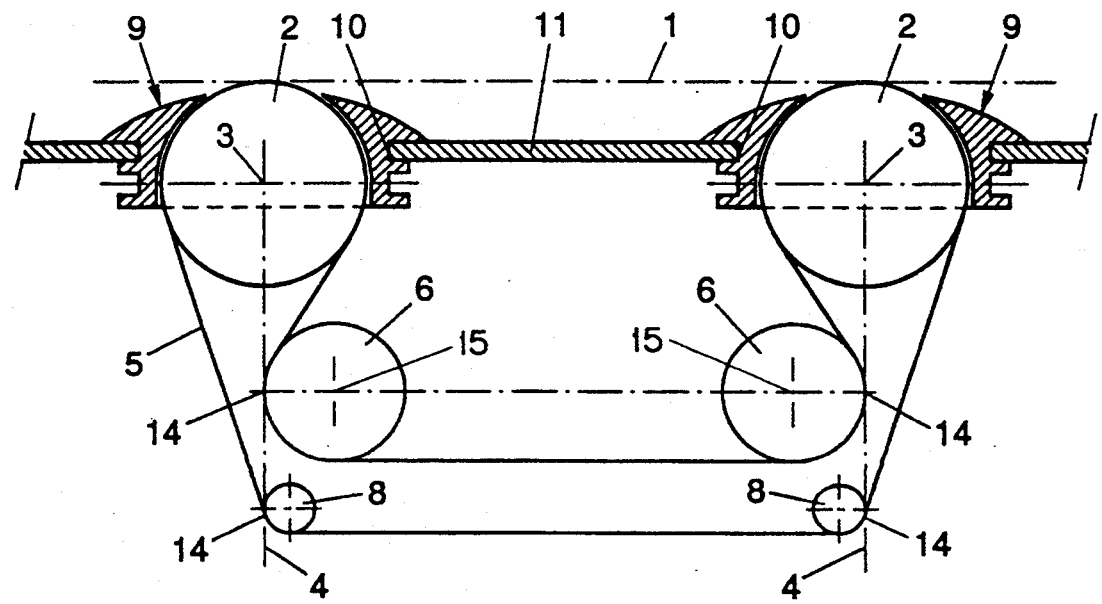
FIG. 4 is a diagrammatic cutaway side elevation of a pair of transport wheels with common drive means according to a fourth exemplary embodiment of the invention.

In the embodiments shown in FIGS. 1 and 4, the transport wheels 2 are each mounted in a two-part holder 9 which, for rotation about the steering axis 4, is suspended in an opening 10 in a cover plate 11 extending parallel to the transport surface 1. A similar suspension is described in applicant's European patent application published under no. 0 438 820, which is hereby referred to.

Figure 2:
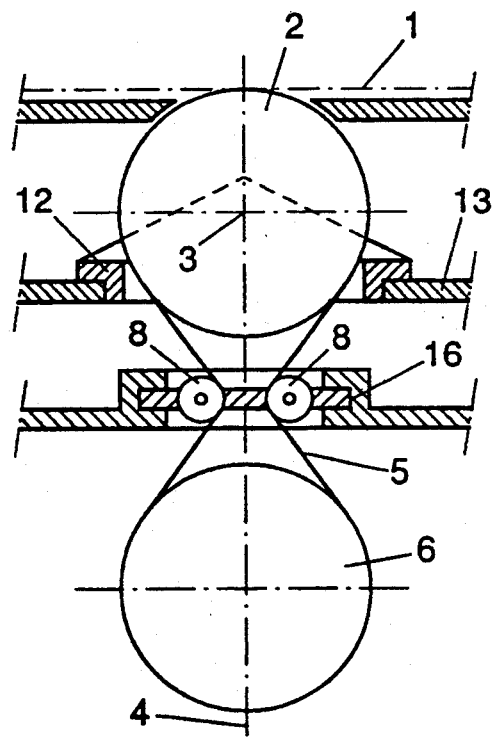
FIG. 2 is a diagrammatic cutaway side elevation of a transport wheel with drive means according to a second exemplary embodiment of the invention.
Figure 3:
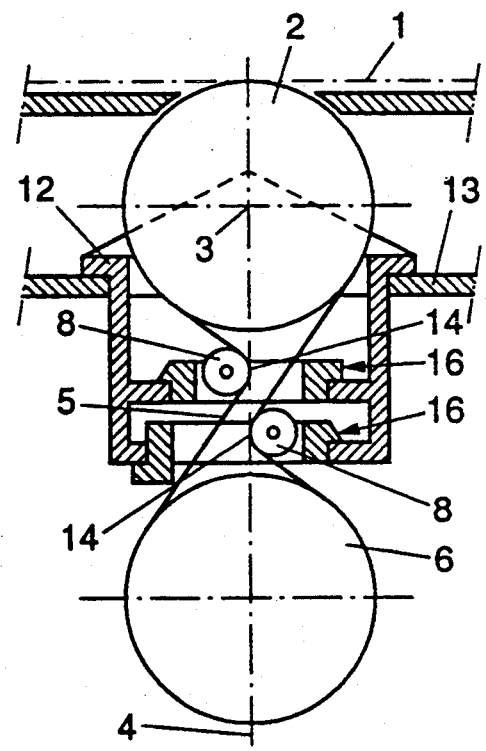
FIG. 3 is a diagrammatic cutaway side elevation of a transport wheel with drive means according to a third exemplary embodiment of the invention.

In the embodiments according to FIGS. 2 and 3 each of the transport wheels 2 is suspended in a holder 12 suspended for rotation in a support 13 spaced under the transport surface 1. Such a suspension can also be used in the embodiment shown in FIG. 5.

As shown in FIGS. 3 and 4, at the location of the divert rollers 8 the string 5 extends along positions 14 coaxial with the steering axis 4 of an associated transport wheel 2 at different distances from the transport surface 1. By virtue of the string 5 being thus tensioned on opposite sides of the driven string wheel 2 towards a position coinciding with the steering axis, there is substantially no variation in the length of the string 5 if the transport wheel 2 is pivoted about the steering axis 4. Any variation in the length of the string 5 is caused by the circumstance that the position where the string 5 abuts the divert rollers 8 is dependent on the orientation of the centerline 3 of the driven string sheave 2.

Figure 5:
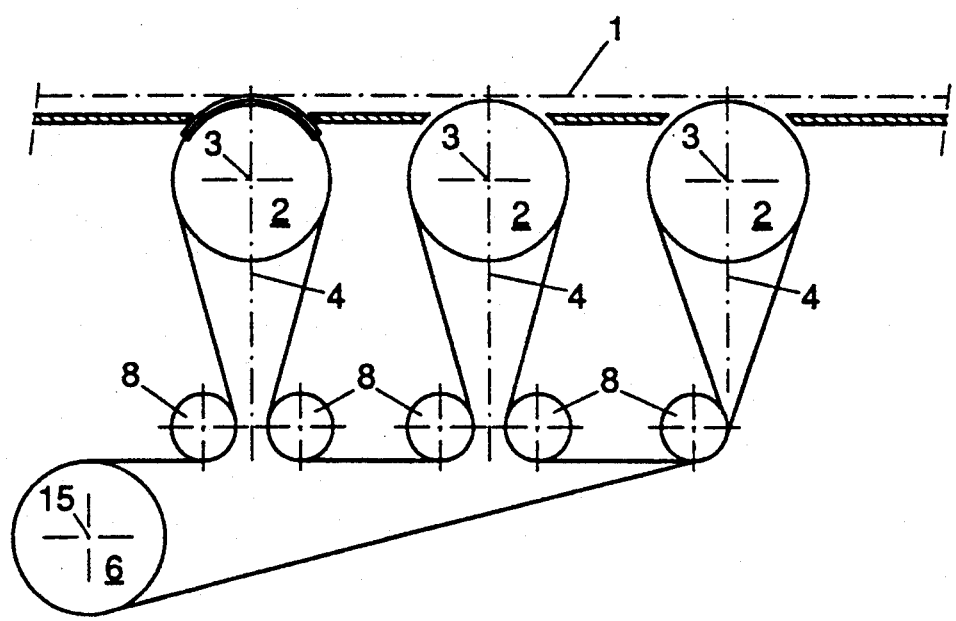
FIG. 5 is a diagrammatic cutaway side elevation of three transport wheels with common drive means according to a fifth, most preferred exemplary embodiment of the invention.

In the embodiments shown in FIGS. 2 and 5 the driven string wheel 2 is suspended in such a manner that the associated steering axis 4 is located in the effective central plane thereof. Further, the axes of divert rollers 8 associated with a given transport wheel 2 are suspended in equally spaced relationship relative to the transport surface 1 and the string, at the location of the two divert rollers 8, is guided along positions equally spaced from the steering axis 4 of the associated transport wheel 2. Through these measures the length of the string portions between the driven string sheave 2 and the divert rollers on opposite sides of each driven string sheave 2 increases or decreases to the same extent when the string sheave 2 is being pivoted about the steering axis 4. In turn, the result thus achieved is that steering movements of the transport wheels 2 do not cause rotation of those transport wheels 2 about the centerlines 3 thereof. Such rotations could cause displacements or modifications in the orientation of articles supported by the transport wheels 2. For different applications, such as the transport of sheets of paper, these effects would entail the problem that the position and the orientation of the article are not controllable or at any rate are hard to control.

In the exemplary embodiments shown in FIGS. 1, 4 and 5, the driving string sheave 6 is rotatable about an axis 15 spaced from the steering axis 4 of the associated transport wheel 2. As a result, the overall height of the apparatus can be further limited because the driving string sheave 6 need not be arranged under the divert rollers 8. Further, in this way transport wheels 2 on opposite sides of and at different distances from a drive shaft parallel to the transport surface 1 can be driven by that drive shaft.

The strings 5 of the embodiments shown in FIGS. 4 and 5 moreover extend from a divert roller 8 associated with a first transport wheel 2 to a divert roller 8 associated with a next transport wheel 2, so that the first and the second transport wheel 2 can be driven by one and the same string 5. Thus the number of components of the apparatus can be limited. Consideration of FIG. 5 further teaches that the number of transport wheels 2 to be driven by one and the same string can be simply extended by addition of further transport wheels 2 and divert rollers 8 in configurations corresponding to the two left-hand transport wheels 2 and associated divert wheels 8.

The stretch of the string 5 is load-dependent. In this connection, the load and hence the stretch of the string 5 increases, viewed in the direction of circulation of the string, as it passes each driven string sheave 2. As a result, upon stretch of the string 5, string sheaves 2 rotate faster according as they are located closer to the driving string sheave 6 viewed in the direction of circulation of the string 5. Accordingly, it is advantageous—and particularly so if several transport wheels 2 are driven by one and the same string 5—if the string comprises low-stretch material, such as steel wire, glass fibers or aramid fibers.

Differences in rotational speed between different transport wheels driven by one and the same string can be prevented by providing the string 5 with projecting elements, such as spheres having a constant relative distance at a given string tension. Even when such projecting elements are used, however, it is advantageous if the string comprises low-stretch material, because otherwise stretch may occur to such an extent that the spheres do not properly fall into the corresponding profiles in the string sheaves.

If the variations in the length of the string upon pivotal motion of the transport wheels are such that the use of a sufficiently low stretch string leads to unacceptable variations in tension, the apparatus can be provided with a string tensioner, for instance in the form of a resiliently suspended divert wheel pressing against the string. In that case, preferably one of the divert rollers 8 is used as string tensioner.

In the embodiments shown in FIGS. 2 and 3 the divert rollers 8 are pivotable about the steering axis 4 in a plane parallel a plane containing to the axes of those divert rollers 8. As a result, the divert rollers 8 can follow the pivotal motions of the driven string sheave 2 to some extent, which in turn provides for improved travel of the string 5 over divert rollers 8. In both exemplary embodiments, the divert rollers 8 are pivotable by virtue of their being suspended in a holder 16 which is rotatably suspended.

According to FIG. 1 the driven string sheave 7 is suspended coaxially with and spaced from the associated transport wheel 2. The transport wheel is suspended obliquely relative to the transport surface 1 such that the centerline 3 of the transport wheel 2 intersects the transport surface 1 on the side of the transport wheel 2 that is remote from the associated driven string sheave 7. The distance between the string 5 and the steering axis 4 decreases from the driven string sheave 7 towards the divert rollers.

By virtue of these measures, a transport wheel 2 that is pivotable about a steering axis 4 extending through the point of contact of the wheel 2 and the transport surface 1, can be driven by a separate string sheave 7 spaced from the transport wheel 2, while yet the string passes over divert rollers 8 in the area of the steering axis 4, causing only slight variations in the length of the string 5 upon pivotal motion of the transport wheel 2. This is particularly advantageous if the apparatus is intended for use in a dirty environment, it being of importance that the drive is accommodated while being screened behind the cover plate 11. By virtue of the axis 3 of the transport wheel 2 and the string sheave 7 being oriented so as to diverge from the transport surface towards the string sheave 7, relatively much space is available for the string sheave 7 between the axis 3 and the holder 9.

In the apparatuses according to the embodiments shown in FIGS. 2–5, the string 5 extends over the outer circumference of the transport wheel 2. Such a construction has a simple structure and is particularly suitable for light applications in a relatively clean environment, for instance the conveyance of sheets of paper.

Within the concept of the invention many other designs are conceivable. In particular, the different features of the respective embodiments shown can generally be combined in different ways to thereby obtain further embodiments of the invention.

Depending on the requirements entailed in the intended use of the conveying apparatus according to the invention, it is also possible to construct only a limited number of the transport wheels of an apparatus as drivable and steerable wheels and to construct the other transport wheels as idling co-pivoting caster wheels. If desired, a number of the transport wheels can be made exclusively steerable and not drivable.

I claim:

1. A conveying apparatus for displacing articles having at least one substantially flat side along a transport surface in different directions, said apparatus comprising:
   a plurality of driven transport wheels each suspended for rotation about a centerline thereof and for pivotal movement about an associated steering axis directed perpendicularly to the transport surface; and
   at least one string passing over a driving sheave and driven sheaves and, between said driving sheave and each of the driven sheaves, at least two divert rollers from which the string extends to the same driven sheave, each of said driven sheaves and said at least two divert rollers each being associated with one of the transport wheels, the driven sheaves each being pivotable along with the associated transport wheel about the associated steering axis;
   wherein the string passes over each of the divert rollers in an area close to the steering axis of the transport wheel associated with said divert rollers.

2. A conveying apparatus according to claim 1, wherein the string passes over the circumferential surface of the transport wheel.

3. A conveying apparatus according to claim 1, wherein the divert roller urges the string towards the steering axis.

4. A conveying apparatus according to claim 1, wherein the area in which the string passes over the divert roller is coaxial with the steering axis of the transport wheel with which the divert roller is associated.

5. A conveying apparatus for displacing articles having at least one substantially flat side along a transport surface in different directions, said apparatus comprising:
   a plurality of driven transport wheels each suspended for rotation about a centerline thereof and for pivotal movement about an associated steering axis directed perpendicularly to the transport surface; and
   at least one string passing over a driving sheave and driven sheaves and, between said driving sheave and each of the driven sheaves, at least two divert rollers, each of said driven sheaves and said divert rollers each being associated with one of the transport wheels, the driven sheaves each being pivotable along with the associated transport wheel about the associated steering axis;
   wherein the string passes over said divert rollers at positions which are coaxial with the steering axis of the transport wheel associated with that divert roller and for each of said divert rollers at a different distance from the transport surface.

6. A conveying apparatus for displacing articles having at least one substantially flat side along a transport surface in different directions, said apparatus comprising:

a plurality of driven transport wheels each suspended for rotation about a centerline thereof and for pivotal movement about an associated steering axis directed perpendicularly to the transport surface; and at least one string passing over a driving sheave and driven sheaves and, between said driving sheave and each of the driven sheaves, at least two divert rollers, each of said driven sheaves and said divert rollers each being associated with one of the transport wheels, the driven sheaves each being pivotable along with the associated transport wheel about the associated steering axis;

wherein each driven sheave is suspended so that the steering axis is located in the effective center plane of said driven sheave, and axes of divert rollers associated with one of the transport wheels are located at an equal distance from the transport surface; and wherein the string passes over said divert rollers in areas close to the steering axis of the transport wheel associated with said divert rollers and at identical distances from the steering axis of said transport wheel.

7. A conveying apparatus for displacing articles having at least one substantially flat side along a transport surface in different directions, said apparatus comprising:

a plurality of driven transport wheels each suspended for rotation about a centerline thereof and for pivotal movement about an associated steering axis directed perpendicularly to the transport surface; and at least one string passing over a driving sheave and driven sheaves and, between said driving sheave and one of the driven sheaves, at least one divert roller, each of said driven sheaves and said divert roller each being associated with one of the transport wheels, the driven sheaves each being pivotable along with the associated transport wheel about the associated steering axis;

wherein the string passes over the divert roller in an area close to the steering axis of the transport wheel associated with said divert roller;

wherein at least one of the driven sheaves is suspended coaxially with the associated transport wheel and axially spaced therefrom, the centerline of said transport wheel intersects the transport surface on the side of the transport wheel remote from the associated driven sheave, and the distance between the string and the steering axis decreases from the driven sheave to the divert roller.

8. A conveying apparatus for displacing articles having at least one substantially flat side along a transport surface in different directions, said apparatus comprising:

a plurality of driven transport wheels each suspended for rotation about a centerline thereof and for pivotal movement about an associated steering axis directed perpendicularly to the transport surface; and at least one string passing over a driving sheave and driven sheaves and, between said driving sheave and each of the driven sheaves, at least one divert roller, each of said driven sheaves and said divert roller each being associated with one of the transport wheels, the driven sheaves each being pivotable along with the associated transport wheel about the associated steering axis;

wherein the string passes over the divert roller in an area close to the steering axis of the transport wheel associated with said divert roller;

wherein each driving sheave is rotatable about an axis radially spaced from the steering axis of the associated transport wheel; and wherein the distance between the string and the steering axis decreases from the driven sheave to the driving sheave.

9. A conveying apparatus according to claim 8, comprising at least two divert rollers, wherein the string passes from a divert roller associated with a first one of the transport wheels to a divert roller associated with a second one of the transport wheels, so that said first and second transport wheels can be driven by the same string.

10. A conveying apparatus according to claim 9, wherein the string comprises low-stretch material.

11. A conveying apparatus according to claim 9, wherein the string comprises projecting elements at a mutual interspace that is constant at a given string tension.

12. A conveying apparatus according to claim 8, wherein the divert roller is pivotable about the steering axis in a plane parallel to a plane containing the axis of the divert roller.

13. A conveying apparatus according to claim 8, wherein at least one of the driven sheaves is suspended coaxially with the associated transport wheel and axially spaced therefrom, the centerline of said transport wheel intersects the transport surface on the side of the transport wheel remote from the associated driven sheave, and the distance between the string and the steering axis decreases from the driven sheave to the divert roller.

14. A conveying apparatus according to claim 8, wherein the string passes over the circumferential surface of the transport wheel.

15. A conveying apparatus according to claim 8, wherein the divert roller urges the string towards the steering axis.

16. A conveying apparatus according to claim 8, wherein the area in which the string passes over the divert roller is coaxial with the steering axis of the transport wheel with which the divert roller is associated.

* * * * *